UNITED STATES PATENT OFFICE.

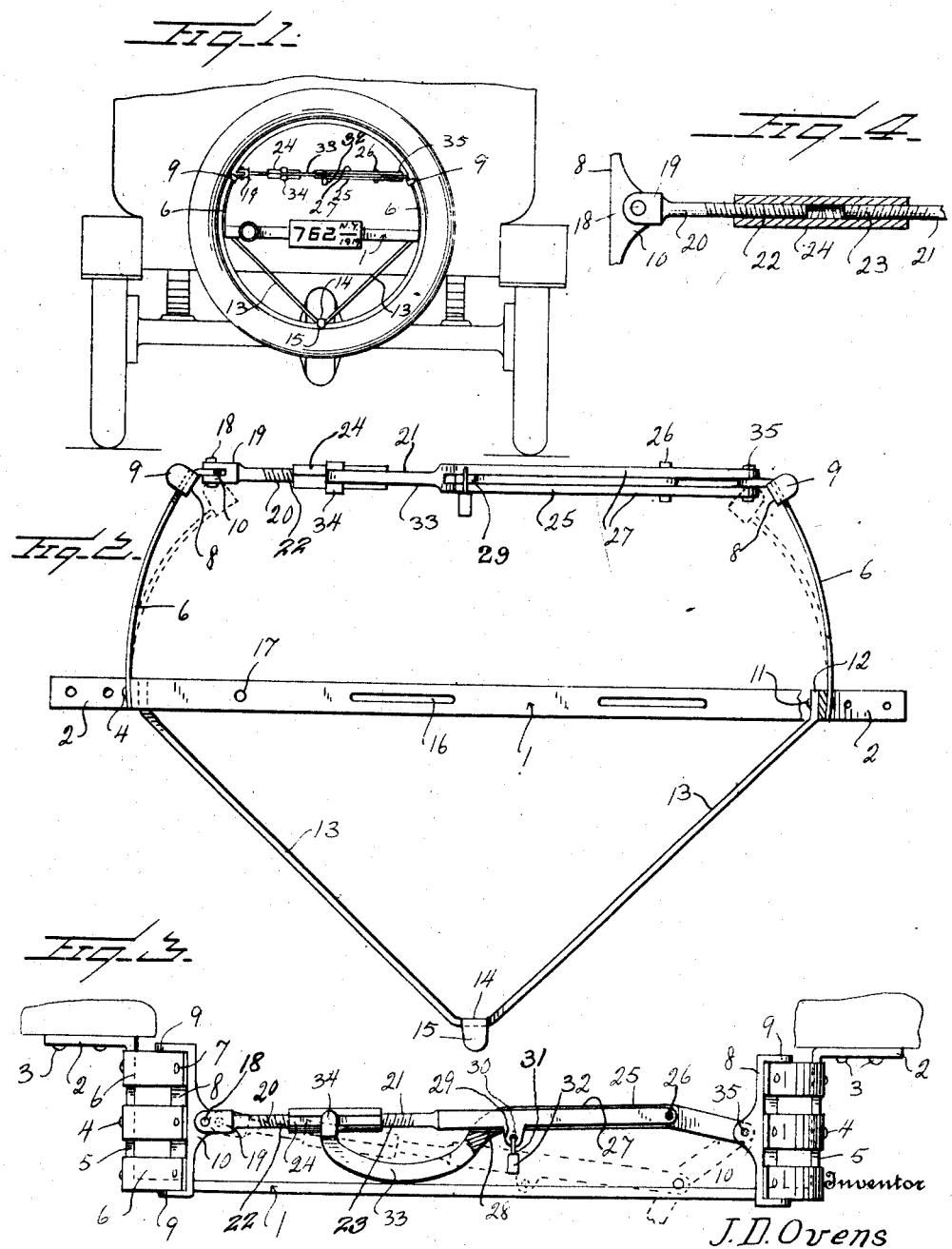

JOHN D. OVENS, OF WALLACE, IDAHO.

TIRE-RACK FOR MOTOR-VEHICLES.

1,365,946.  Specification of Letters Patent.  Patented Jan. 18, 1921.

Application filed October 6, 1919. Serial No. 328,677.

*To all whom it may concern:*

Be it known that I, JOHN D. OVENS, a citizen of the United States, residing at Wallace, in the county of Shoshone and State of Idaho, have invented certain new and useful Improvements in Tire-Racks for Motor-Vehicles, of which the following is a specification, reference being had to the accompanying drawings.

This invention relates to a tire rack for motor vehicles, and an object of the invention is to provide a very simple and efficient device of this kind which is durably constructed and is provided with means for attachment to the vehicle body for carrying auxiliary or emergency wheel tires in position on the vehicle body.

Another object of the invention is to provide a device for the above purpose, capable of being easily and quickly operated, either to secure the tire in place or release the same, and furthermore to provide a rack, which when applied occupies but a comparatively little space.

A further object of the invention resides in the provision of a device, which when manufactured may be produced for a comparatively small cost and sold at a reasonable profit.

A still further object of the invention embodies the provision of means for holding the parts of the rack in different adjusted positions, whereby wheel tires of different diameters may be readily and easily carried on the back of the vehicle body, there being provision of means for locking the parts in different adjusted positions. The present application is a continuation in part of the application of John D. Ovens, 181,290, filed July 18, 1917, and allowed December 17, 1917, but which did not mature into patent, and therefore an additional object of the present invention is to perfect and render more efficient and practical, the construction of the tire carrier disclosed and claimed in the aforesaid application.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a view in rear elevation of a motor driven vehicle, showing the improved tire rack as applied and a tire mounted on the rack.

Fig. 2 is an enlarged rear elevation of the rack detached from the motor vehicle, showing the opposite parts of the rack sprung inwardly toward each other in dotted lines.

Fig. 3 is a plan view of the rack, illustrating the upper fork of the lever 27 broken away and showing the operating and locking lever locked in full lines, and moved rearwardly in dotted lines.

Fig. 4 is an enlarged detail sectional view of the adjustable connections between certain two of the members of the expanding and contracting means for the opposite parts of the rack.

Referring more especially to the drawings, 1 designates a metallic U-shaped strip or strap, which is provided with lateral ends 2 adapted to receive suitable securing means 3, in order to fasten the strip or strap to the vehicle body. Secured at 4 to the portions 5 (which is between the transverse part of the strap and the ends 2) are curved yieldable metallic strips 6. These strips, three in number, though not necessarily, are curved in conformity and concentrically with the contour of the tire. Secured to their upper ends as at 7 are transverse plates 8, on the ends of which are ears 9, to partially overlie and prevent movement of the wheel tire. The plates 8 are provided with laterally extending ears 10.

Secured at 11 to the parts 5 are the lateral extensions 12 of the downwardly converging metallic arms 13, which have their converging lower ends connected integrally with a plate 14, the ends of which are provided with downwardly extending lugs 15. These lugs 15 partially overlie and prevent movement of the wheel tires which are designed to engage the plate 14 and the strips 6.

The transverse portion of the strap 1 is provided with suitable slots 16, to be engaged by any suitable means ( not shown) for holding the license number plate of the automobile in position. The transverse portion of the strap 1 is also provided with an opening 17, to receive any suitable means (not shown), for holding the tail light of the automobile in position. Pivotally connected by means of the bolt 18 to one of the ears 10 on the left of the rack, though not necessarily, are the forks 19 of a rod section 20. A second rod section 21 is provided, and this rod section and the rod section 20 are axially alined and are provided with right and left threads 22 and 23, which are engaged by the turn buckle or turn sleeve 24, whereby the rod sections may be moved toward and from each other axially. The rod section 21 is pivotally connected at one end to the lever 27 by means of a bolt 26. This operating lever 27 for the greater portion of its length is forked, and between the forks 25 of said lever the rod section 21 operates. When the crotch 28 between the forks 25 of the operating lever is in contact with the turnbuckle and the greater portion of said lever is in alinement with the rod section 21, the lever is in position to be locked. Projecting from the rod section 21 is an ear 29, which extends rearwardly and is provided with an aperture 30. This ear protrudes far enough rearwardly of the forks 25, so that a shackle 31 of a padlock 32 may engage the aperture. The operating lever 27 is provided with a curved extension arm 33, the extremity of which is provided with curved forks 34, adapted to conform to and engage a turn buckle or sleeve 24, in order to retard the movement of the turn buckle or sleeve, should a fraudulent attempt be made to adjust the sleeve or turn buckle sufficiently to move the rod sections toward each other and draw the straps 6 toward each other for the purpose of fraudulently removing the wheel tire. The lever 27 is in turn pivotally connected by means of a bolt 35 to the ear 10 of the other plate 8. In fact the forks 25 of the lever 27 straddle the ear 10 of the other plate 8.

In order to support several tires on the back of the body of a motor vehicle, the lever 27 is first unlocked by removing the padlock, and then swung rearwardly. The action of the lever draws the two opposite strips 6 toward each other sufficiently to permit a wheel tire to pass over certain of the lugs 9 and 15. The lever is then moved to a closed position until the crotch 28 engages the rod section 21 and until the ear 29 projects far enough beyond the forks 25, and also until the curved forks 34 engage the turn buckle 24. The ear is designed to extend far enough rearwardly, so that its aperture may receive the shackle of the padlock, and as a result of this construction and arrangement of parts, the crotch between the curved forks 34 of the curved arm 33 will engage the sleeve or turn buckle, thereby preventing its movement, should an attempt be made to operate the rod section fraudulently. However, before the lever is closed, the turn buckle or sleeve is manipulated sufficiently to move the rod sections axially from each other sufficiently, so that when the opposite strips 6 are spread apart, the wheel tire will be sufficiently expanded to hold the same on the rack, in fact in engagement with the strips 6 and plate 14. It will be noted that the strips 6 are sufficient in number to support three wheel tires, though not necessarily, for it is obvious that any number of strips 6 may be used.

The invention having been set forth, what is claimed as new and useful is:

1. A tire rack for vehicles comprising an angular bracket carried upon the body of the vehicle, a resilient metallic frame fixed at diametrically opposite points to the ends of said bracket and having free relatively movable end portions extending above the bracket, an operating lever pivotally connected to one of the free end portions of the frame adjacent its extremity and movable in a horizontal plane, a rod connected at a corresponding point to the other free end portion of said frame, said lever having a longitudinally curved section, the rod being pivotally connected to said lever intermediate said curved section of the lever and its pivot, the extremity of the lever being adapted for contact against said rod to limit the rod and the lever in their relative movements to one position and retain the several pivots in alinement with each other between the end portions.

2. In a rack for vehicles the combination with an angular bracket carried upon the body of the vehicle, of a resilient frame fixed at opposite points to the ends of said bracket and having free relative movable end portions extending above the bracket, an operating lever pivotally connected to one of the free end portions of the frame adjacent its extremity and movable in a horizontal plane, a rod pivotally connected at a corresponding point to the other free end portion of the frame and comprising two axially alined sections, a turn sleeve connecting the sections, said lever provided with elongated forks having portions offset from their ends pivotally connected to one end of the rod, whereby a large portion of the rod may move between the forks, said portion of the rod moving between the forks having a lug projecting rearwardly beyond the forks and adapted to receive a locking means to hold the rod closed between the forks, the lever from a point adjacent the base of the forks of the lever having a longitudinally curved section, the extremity of which is provided with curved forks, the crotch between which is adapted for contact with the turn sleeve to limit the lever and the rod in their relative movement to one position and retain the several pivots in alinement with each other between the end portions.

3. In a tire rack for vehicles, an angular bracket fixed upon the body of the vehicle, downwardly converging arms connected to the ends of the bracket and having means at their converging ends to engage a tire, a plurality of curved strips secured to the ends of the bracket, curved upwardly and toward each other and being opposite each other, means for holding the strips relatively uniform in positions, an operating lever having elongated forks pivotally connected to one of said holding means of said strips, and being movable in a horizontal plane and having a longitudinally curved end section, a rod pivotally connected to the holding means of certain of the ends of said strips and being in turn pivotally connected between the medial portions of the forks of said lever at a point between the longitudinally curved section and its pivot to the first holding means, whereby the large portion of the rod may engage between the forks of the lever, said larger portion of the rod engaging between the forks having a lug projecting rearwardly of the forks and adapted to receive a locking device, the extremity of the curved section of the lever adapted for contact against said rod to limit the rod and the lever in one position, which together with the locking device retain the several pivots in alinement with each other between the opposite means of said strips.

4. In a tire rack for vehicles, the combination with an angular bracket carried by the body of the vehicle, of resilient frames, one connected to each end of the bracket, said frames being curved upwardly and toward each other and having relatively movable end portions extending over the bracket, an operating lever having forks pivotally connected to the free relatively movable end portion of one frame, a rod comprising two sections axially and adjustably united, one section of the rod pivoted between the forks of said lever at a point offset from the pivot of the lever to the free end portion of one of the frames, and adapted to lie in the crotch between the forks when the lever and rod are in locked positions, the other section being pivotally united to the free end portion of the other frame, said lever having a curved part extending to the rear of the rod, and terminating in a part returned in a direction toward the rod and having means to detachably engage said rod to hold the rod and parts of the forks in alinement, and to limit the pivot between the rod and the forks in its movement forwardly, said section of the rod which engages between the forks having a rearwardly extending lug, and means carried by the lug to prevent the lever and the rod from opening or moving rearwardly.

In testimony whereof I hereunto affix my signature.

JOHN D. OVENS.